Patented Mar. 7, 1950

2,499,417

UNITED STATES PATENT OFFICE 2,499,417

TRIALKYL AMMONIUM HALIDES OF BENZ-HYDRYL-AMINOETHYL ETHER

George Rieveschl, Jr., and Robert W. Fleming, Grosse Pointe Woods, Mich., assignors to Parke, Davis & Company, Detroit, Mich., a corporation of Michigan No Drawing. Application July 15, 1946, Serial No. 683,776

6 Claims. (Cl. 260—567.6)

This invention relates to new quaternary ammonium halides and to methods for obtaining the same. More particularly, the invention relates to β-(benzhydryloxy)ethyl-dimethylalkyl-ammonium halides of the formula,

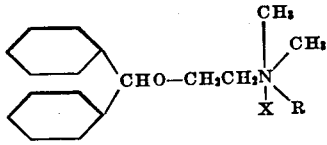

where R is a straight chain alkyl radical containing 8 to 12 carbon atoms inclusive and X is a chlorine, bromine or iodine atom.

In accordance with the invention, quaternary ammonium halides of the above formula are produced by the reaction of a straight chain alkyl halide, RX, containing 8 to 12 carbon atoms in the alkyl radical with β-dimethylaminoethyl benzhydryl ether. Alternatively, these new products may be obtained by the reaction of a β-haloethyl benzhydryl ether with a dimethyl-alkyl-amine containing 8 to 12 carbon atoms in the alkyl radical. These processes may be carried out by heating the two reactants in the presence or absence of a substantially anhydrous, inert organic solvent. Such solvents are, for example, ethyl acetate, isopropanol, benzene, toluene and xylene.

The new compounds of the present invention possess a high degree of germicidal activity against pathogenic organisms and are not irritating to human skin when applied in concentrations many times greater than that necessary to kill the micro-organisms. Aqueous or alcoholic solutions of these compounds may be used for a variety of purposes other than the application to cuts, wounds and abrasions. For example, they may be used in sterilizing surgical instruments, disinfecting contaminated wall or floor surfaces and as a preservative for pharmaceutical products. They may also be incorporated into soap-like products to provide germicidal products useful in cleansing the hands, feet, etc. These new quaternary ammonium halides are also useful as wetting agents and solubilizers.

The invention is illustrated by the following examples.

*Example 1.—β-(Benzhydryloxy)ethyl-dimethyl-n-octylammonium bromide*

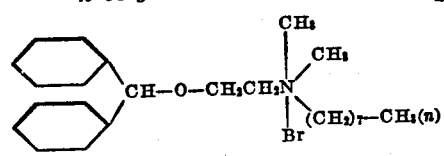

A mixture consisting of 25.5 g. of β-dimethyl-aminoethyl benzhydryl ether and 22 g. of n-octyl bromide in 100 cc. of ethyl acetate is heated under reflux for six hours. Most of the ethyl acetate is distilled off, the residue cooled and treated with about 200 cc. of dry ether. The product which separates as an oil solidifies on rubbing and is purified by recrystallization from isopropanol-ether mixture; M. P. 101–103° C.

The germicidal effectiveness of this product and the other compounds of the invention may be determined by the standard Food and Drug Administration germicide test against such organisms as *Eberthella typhosa*, *Staphylococcus aureus* and *Pseudomonas aeruginosa*. This test is conducted by determining the dilution in water at which the germicide will kill all the organisms contained in 0.5 cc. of a twenty-four hour broth culture within five minutes at 20° C. When tested by this method β-(benzhydryloxy)ethyl-dimethyl-n-octylammonium bromide was found to kill *Eberthella typhosa* at a dilution of 1 to 5,500, *Staphylococcus aureus* at a dilution of 1 to 7,000 and *Pseudomonas aeruginosa* at a dilution of 1 to 2000.

*Example 2.—β-(Benzhydryloxy)ethyl-dimethyl-n-nonylammonium bromide*

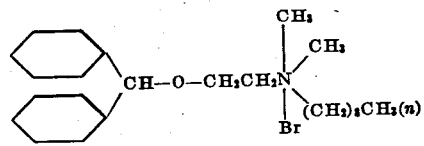

A solution of 25 g. of n-nonyl bromide and 25.5 g. of β-dimethylaminoethyl benzhydryl ether in 100 cc. of ethyl acetate is heated for six hours under reflux. Most of the solvent is distilled from the reaction mixture, the residue cooled and treated with about 200 cc. of dry ether. The desired β-(benzhydryloxy)ethyl-dimethyl-n-nonyl bromide separates as an oil but is readily crystallized on rubbing. It may be purified by recrystallization from isopropanol-ether mixture; M. P. 101.5–103.5° C.

The compound of this example when tested for germicidal activity by the test given in Example 1 kills *Eberthella typhosa* at a dilution of 1 to 18,000. *Staphylococcus aureus* at a dilution of 1 to 20,000 and *Pseudomonas aeruginosa* at a dilution of 1 to 2500.

*Example 3.—β-(Benzhydryloxy)ethyl-dimethyl-n-nonylammonium chloride*

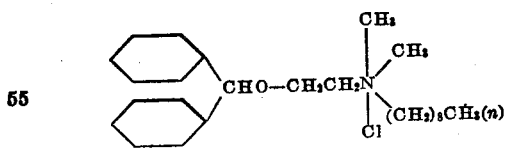

A mixture consisting of 26 g. of β-chloroethyl benzhydryl ether and 17 g. of dimethyl-n-nonyl-amine in 100 cc. of benzene is heated under reflux for ten hours. The mixture is cooled, the benzene decanted and the residue stirred with dry ether. The white crystalline β-(benzhydryloxy)-ethyl-dimethyl-n-nonylammonium chloride is collected and purified by recrystallization from isopropanol-ether mixture.

The germicidal effectiveness of the product of this example is of the same degree as that of the corresponding bromide shown in Example 2.

*Example 4.—β - (Benzhydryloxy)ethyl-dimethyl-n-decylammonium bromide*

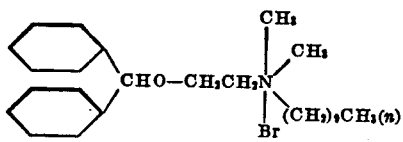

25 g. of n-decyl bromide is added to a solution of 25.5 g. of β-dimethylaminoethyl benzhydryl ether in 100 cc. of ethyl acetate and the resulting solution heated on a steam bath under reflux for six hours. Most of the ethyl acetate is removed by distillation, the residue cooled and treated with about 250 cc. of dry ether. On rubbing the oily β-(benzhydryloxy)ethyl - dimethyl-n-decyl-ammonium bromide crystallizes to a white solid. The crude product is collected, washed with ether and purified by recrystallization from isopropanol-ether mixture; M. P. 96–8° C.

The compound of this example is particularly effective against *Eberthella typhosa* and *Staphylococcus aureus*. When tested by the test outlined in Example 1 this product was found to kill *Eberthella typhosa* at a dilution of 1 to 45,000, *Staphylococcus aureus* at a dilution of 1 to 40,000 and *Pseudomonas aeruginosa* at a dilution of 1 to 1000.

*Example 5.—β - (Benzhydryloxy)ethyl-dimethyl-n-decylammonium chloride*

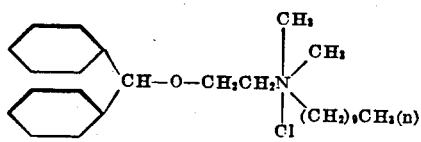

A mixture consisting of 31 g. of dimethyl-n-decylamine and 26 g. of β-chloroethyl benzhydryl ether in 150 cc. of toluene is heated under reflux for eight hours, cooled and the desired β-(benzhydryloxy)ethyl - dimethyl - n - decylammonium chloride collected by filtration. It may be purified by recrystallization from isopropanol-ether mixture.

The compound of this example possesses about the same degree of germicidal effectiveness against pathogenic organisms as the corresponding bromide shown in Example 4.

*Example 6.—β - (Benzhydryloxy)ethyl-dimethyl-n-hendecylammonium bromide*

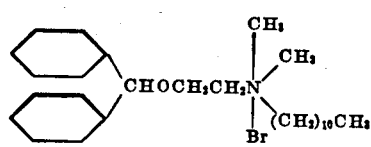

25.8 g. of n-hendecyl bromide is added to a solution of 25.5 g. of β-dimethylaminoethyl benzhydryl ether in 100 cc. of ethyl acetate and the resulting mixture heated on a steam bath for eight hours. Most of the solvent is distilled, the residue cooled and treated with about 250 cc. of dry ether. On stirring the oily β-(benzhydryloxy)ethyl - dimethyl-n-hendecylammonium bromide crystallizes. The crude product is collected and purified by recrystallization from isopropanol-ether mixture.

The germicidal effectiveness of this product is comparable to that of the corresponding compound having ten carbon atoms in the long chain alkyl group, e. g. the compound of Example 4.

*Example 7.—β - (Benzhydryloxy)ethyl-dimethyl-n-hendecylammonium iodide*

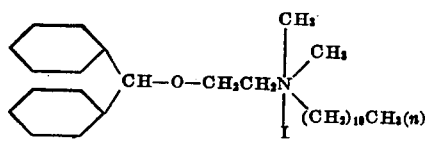

A mixture consisting of 31 g. of n-hendecyl iodide and 25.5 g. of β-dimethylaminoethyl benzhydryl ether in 100 cc. of benzene is refluxed for eight hours, cooled and the benzene decanted. If the residue is not crystalline at this point, it is washed with ether and then stirred with a fresh portion of ether until it crystallizes. The crude β-(benzhydryloxy)ethyl-dimethyl - n - hendecylammonium iodide is collected and purified by recrystallization from isopropanol-ether mixture.

The compound of this example exhibits a particularly high germicidal activity against microorganisms such as *Eberthella typhosa*.

*Example 8.—β-(Benzhydryloxy)ethyl - dimethyl-n-dodecylammonium bromide*

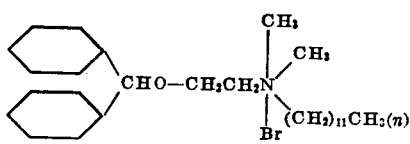

28 g. of n-dodecyl bromide is added to a solution of 25.5 g. of β-dimethylaminoethyl benzhydryl ether in 100 cc. of ethyl acetate and the mixture heated under reflux on a steam bath for seven hours. Most of the ethyl acetate is removed by distillation, the residue cooled and treated with 250 cc. of dry ether. The resulting oil is rubbed until it crystallizes and the crude crystalline product collected. The crude β-(benzhydryloxy)ethyl-dimethyl-n-dodecylammonium bromide may be purified by recrystallization from isopropanol-ether mixture; M. P. 97–99° C.

The β-dimethylaminoethyl benzhydryl ether and the various β-haloethyl benzhydryl ethers used as starting materials in the practice of the present invention may be prepared as described in the copending application of George Rieveschl, Jr., Serial No. 531,639, filed April 18, 1944, now Patent No. 2,421,714, issued June 3, 1947.

For example, the starting material used in Example 1, β-dimethylaminoethyl benzhydryl ether, may be prepared by reacting β-dimethylaminoethanol with benzhydryl bromide at 120–25° C. in the presence of anhydrous sodium carbonate. After the reaction has been completed, about 6½ hours, water is added to the reaction mixture and the free base extracted with ether. The ether extract is extracted with 1 to 4 hydrochloric acid, the acidic extract made alkaline with 20% sodium hydroxide solution and the free base extracted with ether. After drying, the ether is distilled and the residue distilled in vacuo to obtain the free base, β-dimethylaminoethyl benzhydryl ether, boiling at 150-65° C./2 mm.

The other starting materials used in the practice of the invention, the β-haloethyl benzhydryl ethers, such as the compound used in Example 3, β-chloroethyl benzhydryl ether, may be prepared as follows:

A mixture consisting of benzhydryl bromide, anhydrous potassium carbonate and ethylene chlorohydrin is heated and stirred at 120–130° C. for eight hours. Carbon dioxide is evolved. Benzene is added with stirring, the precipitate filtered off and washed with benzene. The benzene is removed by distillation and then the β-chloroethyl benzhydryl ether is distilled in vacuo; B. P. 170° C./10 mm.

What we claim as our invention is:

1. A compound of the formula,

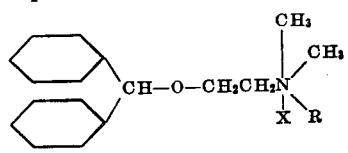

where R is a straight chain alkyl radical containing 8 to 12 carbon atoms inclusive and X is a member of the class consisting of chlorine, bromine and iodine.

2. A compound of the formula,

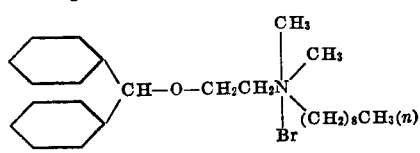

3. A compound of the formula,

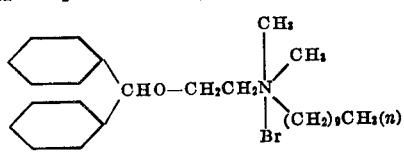

4. A compound of the formula,

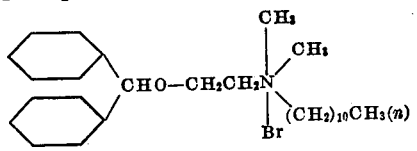

5. A compound of formula,

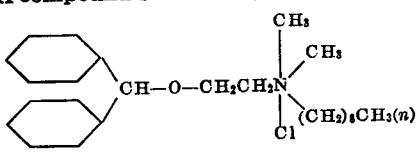

6. A compound of formula,

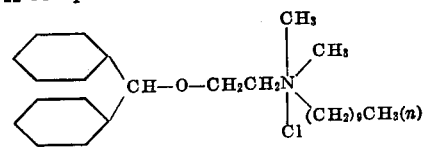

GEORGE RIEVESCHL, JR.
ROBERT W. FLEMING.

REFERENCES CITED

The following references are of record in the file of this patent:

UNITED STATES PATENTS

| Number | Name | Date |
| --- | --- | --- |
| 2,044,099 | Piggott et al. | June 16, 1936 |
| 2,087,131 | Taub | July 13, 1937 |
| 2,202,864 | Piggott et al. | June 4, 1940 |
| 2,397,799 | Martin et al. | Apr. 2, 1946 |
| 2,421,714 | Rieveschl | June 3, 1947 |

OTHER REFERENCES

Winder et al., "J. Pharmacol. and Exp. Therap.," vol. 87 (1946), pp. 124 and 125.